United States Patent [19]

Goebel et al.

[11] 3,818,073

[45] June 18, 1974

[54] INSECTICIDAL AGENTS

[75] Inventors: Helmut Goebel; Gerhard Hörlein, both of Frankfurt/Main; Ludwig Emmel, Bergen-Enkheim, all of Germany

[73] Assignee: Farbwerke Hoechst Aktiengesellschaft Vormals Meister Lucius & Bruning, Frankfurt/Main, Germany

[22] Filed: Mar. 8, 1972

[21] Appl. No.: 232,968

[30] Foreign Application Priority Data
Mar. 9, 1971  Germany............................ 2111156

[52] U.S. Cl...... 260/482 C, 260/472, 260/566 AC, 424/300, 424/327
[51] Int. Cl......................................... C07c 125/06

[58] Field of Search................................ 260/482 C

[56] References Cited
FOREIGN PATENTS OR APPLICATIONS
1,156,781  3/1970  Germany........................... 260/482

Primary Examiner—Lorraine A. Weinberger
Assistant Examiner—Paul J. Killos
Attorney, Agent, or Firm—Curtis, Morris & Safford

[57] ABSTRACT

This invention is concerned with novel derivatives of 3-hydroxy-2,2-dimethylpropanaloxime, viz. compounds of the general formula R-O-$CH_2$-C$(CH_3)_2$-CH=NO-CO-NH$R_1$, of which R and $R_1$ are defined in the specification. The novel compounds exert insecticidal properties.

10 Claims, No Drawings

INSECTICIDAL AGENTS

The present invention provides compounds of the general formula

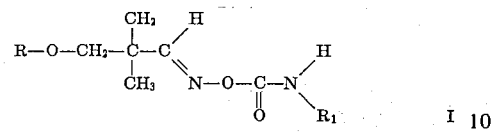

where R is hydrogen or a radical of the formula

and $R_1$ or $R_2$ is an alkyl or alkenyl group having from one to four carbon atoms, or a phenyl or naphthyl radical, in which one or more hydrogen atoms may be substituted by halogen and/or alkyl groups having from one to four carbon atoms. Preferred halogen atoms are chlorine and/or bromine atoms, preferred alkyl groups are the methyl and/or ethyl group. As aromatic radicals, phenyl radicals in which zero, one or two hydrogen atoms are substituted as defined above are preferred.

The present invention furthermore provides a process for the preparation of these novel compounds, which comprises reacting 3-hydroxy-2,2-dimethylpropanaloxime of the formula $$HOCH_2—C(CH_3)_2—CH=NOH$$

with 1 mole of an isocyanate of the formula $R_1NCO$, and isolating the compound of the formula I (R being H) so obtained, or, optionally, by reacting this compound with a further mole of an isocyanate of the formula $R_2NCO$ and subsequently isolating the reaction product.

When $R_1$ is the same as $R_2$, this reaction is advantageously carried out in a single step using 2 moles of isocyanate.

This reaction of the hydroxy-propanaloxime with the isocyanate is carried out in known manner, for example at temperatures of from 10° to 60°C, preferably from 30° to 50°C, in a solvent which is inert under the reaction conditions, such as benzene, toluene, hexane, methylene chloride, $CCl_4$, chloroform, or ether, such as di-isopropyl ether, tetrahydrofuran or dioxan.

Inert solvents having a boiling point of less than 130°C are preferred.

After complete reaction, the solvent is distilled off and the reaction product is obtained either as a crystalline compound or, often, as an oil.

Numerous compounds of the formula I can be obtained in the process of the invention, for example
3-hydroxy-2,2-dimethylpropanal-(O-methyl-carbamoyloxime),
3-hydroxy-2,2-dimethylpropanal-(O-ethyl-carbamoyloxime),
3-hydroxy-2,2-dimethylpropanal-(O-n-propyl-carbamoyloxime),
3-hydroxy-2,2-dimethylpropanal-(O-isopropyl-carbamoyloxime),
3-hydroxy-2,2-dimethylpropanal-(O-allyl-carbamoyloxime),
3-hydroxy-2,2-dimethylpropanal-(O-n-butyl-carbamoyloxime),
3-hydroxy-2,2-dimethylpropanal-(O-isobutyl-carbamoyloxime),
3-hydroxy-2,2-dimethylpropanal-(O-o-chlorophenyl-carbamoyloxime),
3-hydroxy-2,2-dimethylpropanal-(O-m-chlorophenyl-carbamoyloxime),
3-hydroxy-2,2-dimethylpropanal-(O-p-chlorophenyl-carbamoyloxime),
3-hydroxy-2,2-dimethylpropanal-(O-3,4-dichlorophenyl-carbamoyloxime),
3-hydroxy-2,2-dimethylpropanal-(O-2,4-dichlorophenyl-carbamoyloxime),
3-hydroxy-2,2-dimethylpropanal-(O-4-bromophenyl-carbamoyloxime),
3-hydroxy-2,2-dimethylpropanal-(O-2-methyl-5-chlorophenyl-carbamoyloxime),
3-hydroxy-2,2-dimethylpropanal-(O-2-chloro-5-methylcarbamoyloxime)
3-hydroxy-2,2-dimethylpropanal-(O-α-naphthyl-carbamoyloxime),
3-hydroxy-2,2-dimethylpropanal-(O-β-naphthyl-carbamoyloxime),
3-hydroxy-2,2-dimethylpropanal-(O-o-methylphenyl-carbamoyloxime),
3-hydroxy-2,2-dimethylpropanal-(O-m-methylphenyl-carbamoyloxime),
3-hydroxy-2,2-dimethylpropanal-(O-p-methylphenyl-carbamoyloxime),
3-hydroxy-2,2-dimethylpropanal-(O-o-ethylphenyl-carbamoyloxime),
3-hydroxy-2,2-dimethylpropanal-(O-p-ethylphenyl-carbamoyloxime),
3-methyl-carbamoyloxy-2,2-dimethylpropanal-(O-methyl-carbamoyloxime),
3-ethyl-carbamoyloxy-2,2-dimethylpropanal-(O-ethyl-carbamoyloxime),
3-propyl-carbamoyloxy-2,2-dimethylpropanal-(O-propyl-carbamoyloxime),
3-butyl-carbamoyloxy-2,2-dimethylpropanal-(O-n-butyl-carbamoyloxime),
3-isobutyl-carbamoyloxy-2,2-dimethylpropanal-(O-isobutyl-carbamoyloxime),
3-p-chlorophenyl-carbamoyloxy-2,2-dimethylpropanal-(O-p-chlorophenyl-carbamoyloxime),
3-o-chlorophenyl-carbamoyloxy-2,2-dimethylpropanal-(O-o-chlorophenyl-carbamoyloxime),
3-m-chlorophenyl-carbamoyloxy-2,2-dimethylpropanal-(O-m-chlorophenyl-carbamoyloxime),
3-(3,4-dichlorophenyl-carbamoyloxy)-2,2-dimethylpropanal-(O-3,4-dichlorophenyl-carbamoyloxime),
3-(p-bromophenyl-carbamoyloxy)-2,2-dimethylpropanal-(O-p-bromocarbamoyloxime),
3-p-chlorophenyl-carbamoyloxy-2,2-dimethylpropanal-(O-methylcarbamoyloxime),
3-(3,4-dichlorophenyl-carbamoyloxy-)-2,2-dimethylpropanal-(O-methyl-carbamoyloxime),
3-ethyl-carbamoyloxy-2,2-dimethylpropanal-(O-methyl-carbamoyloxime), 3-n-propyl-carbamoyloxy-2,2-dimethylpropanal-(O-methyl-carbamoyloxime),
3-allyl-carbamoyloxy-2,2-dimethylpropanal-(O-methyl-carbamoyloxime),
3-isobutyl-carbamoyloxy-2,2-dimethylpropanal-(O-methylcarbamoyloxime),
3-n-butyl-carbamoyloxy-2,2-dimethylpropanal-(O-methyl-carbamoyloxime),
3-methyl-carbamoyloxy-2,2-dimethylpropanal-(O-n-butyl-carbamoyloxime),
3-ethyl-carbamoyloxy-2,2-dimethylpropanal-(O-n-butyl-carbamoyloxime),
3-propyl-carbamoyloxy-2,2-dimethylpropanal-(O-n-butyl-carbamoyloxime),
3-allyl-carbamoyloxy-2,2-dimethylpropanal-(O-n-butyl-carbamoyloxime),
3-isobutyl-carbamoyloxy-2,2-dimethylpropanal-(O-n-butylcarbamoyloxime),
3-(p-chlorophenyl-carbamoyloxy)-2,2-dimethylpropanal-(O-n-butyl-carbamoyloxime),
3-(3,4-dichlorophenyl-carbamoyloxy)-2,2-dimethylpropanal-(O-n-butyl-carbamoyloxime),
3-(p-bromophenyl-carbamoyloxy)-2,2-dimethylpropanal-(o-n-butyl-carbamoyloxime), As insecticides, the compounds of the invention have systemic and contact activity. They may be used in known application forms, such as dusting powders, granules, and preferably spray liquors.

As compared with the known commercial product Aldicarb (2-methyl-2-(methylthio)-propionaldehyde-O-(methyl-carbamoyl)oxime) of the formula $H_3C—S—C(CH_3)_2—CH=NOCONHCH_3$, which, on account of its high toxicity and volatility, must be employed in the form of granules only and worked into the soil, the compounds of the invention must be used in a 2 to 2.5 fold amount in order to achieve the same results; however, their by far lower toxicity (one-twelth to one-fifteenth, as compared with Aldicarb) ensures easier application. When worked into the soil as granules, they have about the equal duration effect as Aldicarb, but their special advantage resides in the fact that they can be employed as spray liquor, especially as aqueous emulsion, which allows to combat pests everywhere and in every stage of growth with success and in a simple manner. Their capability of decomposition, as results from Example 21, allows a spray treatment even just before the harvesting, especially in order to combat the very resistant fruit fly. The poor tendency to volatilization of the compounds according to the invention (Example 22) allows their application in closed rooms, such as greenhouses.

Subject of the present invention are also insecticidal compositions with a content of compounds of the formula I, or the use of said compounds as insecticides. Generally, the content of active agent is from 5 to 90 percent, the remainder being composed of conventional formulation additives comprising solid or liquid inert substances, wetting, adhesion or dispersing agents, or grounding auxiliaries.

The starting substance for the prepartion of the compounds of the invention, namely 3-hydroxy-2,2-dimethyl-propanaloxime (ω-hydroxy-pivalinaldoxime) of the formula II (melting point 29.5°C, boiling point 118°-120°C at 12 mm Hg) is cited in German Pat. No. 726,387 (1939) and can be prepared according to Wessely, Monatshefte 21 (1901), 230. By reaction thereof with 1 to 2 moles of an isocyanate (in the first step, oxime carbamates are obtained) according to the following equation

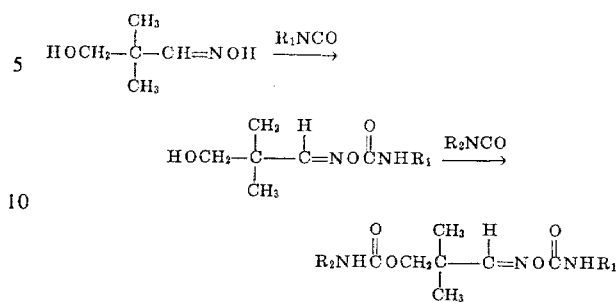

the compounds of the invention are obtained in practically quantitative yields.

The following Examples illustrate the invention.

EXAMPLES OF PREPARATION

EXAMPLE 1

3-hydroxy-2,2-dimethylpropanal-(O-methylcarbamoyloxime)

30 g (0.35 mole) of II were dissolved in 100 ml of chloroform, and 16.2 g (0.352 mole) of methyl isocyanate were added. The temperature of the mixture rose to 50°C, and, after complete reaction, agitation was continued for a further 3 hours at 40°C. After elimination of the solvent in a water jet vacuum, the residue solidified, and, after redissolution in benzene, a product having a melting point of 109°C was obtained. The yield was 46 g.

Analysis:

|  | $C_7H_{14}N_2O_3$ | (MW 174) |  |
|---|---|---|---|
| calculated | C 48.2 % | found | 48.1 % |
|  | H 8.0 % |  | 8.0 % |
|  | N 16.1 % |  | 16.4 % |

The proton resonance spectrum proved a substitution of O-carbamoyl at the oxime radical.

In analogy to Example 1, there were prepared from II: using n-propyl-isocyanate 2. 183-hydroxy-2,2-dimethylpropanal-(O-n-propyl-carbamoyloxime)
colorless oil, $n_D^{20}$ 1.4736
using n-butyl-isocyanate 3. 183-hydroxy-2,2-dimethylpropanal-(O-n-butyl-carbamoyloxime)
oil, $n_D^{20}$ 1.4520
using isobutyl-isocyanate 39. 183-hydroxy-2,2-dimethylpropanal-(O-isobutyl-carbamoyloxime)
oil, $n_D^{20}$ 1.4708

EXAMPLE 4

3-methylcarbamoyloxy-2,2-dimethylpropanal-(O-methylcarbamoyloxime)

35.1 g (0.3 mole) of II were dissolved in 100 ml of chloroform. With cooling by ice, 34.2 g (0.6 mole) of methyl isocyanate were added dropwise. Subsequently, the solution was agitated for a further 5 hours at 40°C, and the chloroform was eliminated in a water jet vacuum. 69 g of a viscous oil remained as residue, having a refractive index of 1.4636.

Analysis:

| | | | |
|---|---|---|---|
| calculated | C$_9$H$_{17}$N$_3$O$_4$<br>N 18,2 % | (MW 231)<br>found | N 18,0 % |

According to Example 4, there were prepared:
using ethyl-isocyanate 5. 183-ethylcarbamoyloxy-2,2-dimethylpropanal-(O-ethylcarbamoyloxime)
viscous oil, $n_D^{20}$ 1.4756
using n-propyl-isocyanate 6. 183-propylcarbamoyloxy-2,2-dimethylpropanal-(O-propylcarbamoyloxime)
viscous oil, $n_D^{20}$ 1.4747
using n-butyl-isocyanate 7. 183-n-butylcarbamoyloxy-2,2-dimethylpropanal-(O-n-butylcarbamoyloxime)
oil, $n_D^{20}$ 1.4763
using isobutyl-isocyanate 7a. 183-isobutylcarbamoyloxy-2,2-dimethylpropanal-(O-isobutylcarbamoyloxime)
viscous oil, $n_D^{20}$ 1.4793
using chlorophenyl-isocyanate 8. 183-p-chlorophenylcarbamoyloxy-2,2-dimethylpropanal-(O-p-chlorophenylcarbamoyloxime)

crystals, m.p. 115° – 116°C (decomposition)

EXAMPLE 9

3-p-chlorophenylcarbamoyloxy-2,2-dimethylpropanal-(O-methylcarbamoyloxime)

To 17.4 g (0.1 mole) of the product of Example 1, dissolved in 100 ml of chloroform, 15.3 g (0.1 mole) of p-chloro-phenyl-isocyanate were added. The mixture was heated for 10 hours to 50°C; the solvent was then eliminated in a water jet vacuum. 32 g of a crystalline product remained, which was recrystallized from chloroform/petroleum ether (60–90), and which had a melting point of 156°C (decomposition).
Analysis:

| | | | |
|---|---|---|---|
| calculated | C$_{14}$H$_{18}$ClN$_3$O$_4$<br>N 12,8 % | (MW 327,5)<br>found | N 12,5 % |

According to Example 9, there were prepared:
using ethyl-isocyanate 10. 183-ethylcarbamoyloxy-2,2-dimethylpropanal-(O-methylcarbamoyloxime
viscous oil; $n_D^{20}$ 1.4540
using n-propyl-isocyanate 11. 3-n-propylcarbamoyloxy-2,2-dimethylpropanal-(O-methylcarbamoyloxime)
oil; $n_D^{20}$ 1.4548
using allyl-isocyanate 12. 183-allylcarbamoyloxy-2,2-dimethylpropanal-(O-methylcarbamoyloxime)
oil; $n_D^{20}$ 1.4637
using isobutyl-isocyanate 13. 183-isobutylcarbamoyloxy-2,2-dimethylpropanal-(O-methylcarbamoyloxime)
oil; $n_D^{20}$ 1.4548

From the product of Example 3, according to Example 9, there was prepared using methylisocyanate:

14. 3-methylcarbamoyloxy-2,2-dimethylpropanal-(O-n-butylcarbamoyloxime) (III, R = n C$_4$H$_9$, R$_1$ = CH$_3$)

oil; $n_D^{20}$ 1.4536

EXAMPLES OF APPLICATION

EXAMPLE 15

Horse beans (*Vicia faba*) being infested with bean aphids (*Doralis fabae*) were sprayed with a suspension containing the compound 3-hydroxy-2,2-dimethylpropanal-(O-methylcarbamoyloxime) of Example 1 in a concentration of 0.06 percent, until the liquid began to drip off. The plants were then stored in a greenhouse at 20°C. When the effect was controlled after 24 hours, all aphids were killed.

When the compounds of Examples 2 or 4 were analogously employed, the same results were obtained.

EXAMPLE 16

Milkweed bugs (*Oncopeltus fasciatus*) on potted cotton plants were sprayed, until the liquid bagan to drip off, with an aqueous dilution of an emulsifiable concentrate, in which 0.125 percent of 3-methylcarbamoyloxy-2,2-dimethylpropanal-(O-methylcarbamoyloxime) of Example 4 was contained.

The plants with the bugs were stored in cylindrical gauze cages at 25°C. 24 hours after the spray treatment, all bugs were killed.

The same results were obtained using the agents of Examples 5, 6, 7 and 8 in an analogous manner.

EXAMPLE 17

3-methylcarbamoyloxy-2,2-dimethylpropanal-(O-methylcarbamoyloxime)

In order to prove systemic properties, 0.25 mg of the agent of Example 4 was homogenously spread in the area of a root ball of horse beans (*Vicia faba*) wrapped in a sheet, which beans were infested with bean aphids, by completely moistening the earth with an aqueous dilution of an emulsifiable concentrate.

The agent penetrates the roots and is rapidly conducted into the upper parts of the plant, where all aphids were killed within 24 hours after the application of the agent.

During the test time, the plants were stored in a greenhouse at 20°C.

EXAMPLE 18

Relapsing fever ticks (*Ornithodorus moubata*) were put into Petri dishes, the cover plate and bottom of which having been uniformly covered with 1 cc. each of a 0.0125 percent acetonic solution of 3-methylcarbamoyloxy-2,2-dimethylpropanal-(O-methylcarbamoyloxime) of Example 4.

24 hours after having put in the test animals, all ticks were killed.

The same results were obtained using the compounds of Example 5 and 6 in an analogous manner.

EXAMPLE 19

Potted cinerariae being infested with Green peach aphid (*Myzodes persicae*) were sprayed, until the liquid began to drip off, with an aqueous dilution of an emulsifiable concentrate containing 0.006 percent of the agent of Example 10. The sprayed plants were stored in a climatic test cabinet at 25°C and a relative atmospheric moisture of 60 percent.

After 24 hours, all pests were found killed.

The same results were obtained when the compounds of Examples 13, 9, 11, 12 and 14 were used in an analogous manner.

EXAMPLE 20

Half-ripe bananas were sprayed, until the liquid began to drip off, with the aqueous dilution of an emulsifiable concentrate containing 0.006 percent of the compound of Example 16. After the sprayed layer had superficially dried, the treated bananas were suspended in glass jars, in which adults of the Mediterranean fruit fly (*Ceratitis capitate*) were present.

The flies repeatedly settled down on the treated bananas and thus were killed already 2 hours after the start of the contact in a 100 percent rate.

EXAMPLE 21

Series of horse beans (*Vicia faba*) were simultaneously sprayed, until the liquid began to drip off, with the aqueous dilution of an emulsifiable concentrate containing 0.025 percent of the compound of Example 16, and, after a superficial drying, infected with bean aphids (*Doralis fabae*) in different time intervals. In this test was proved that the activity of the sprayed layer is still unchanged after 8 days, that after 10 days only 70 percent of the original efficiency is remaining, which efficiency is completely lost after 14 days.

Thus it was also proved that the plants, 14 days after the spray treatment, were freed from the layer of insecticide activity.

In comparison to this test, the agent 2,3-dihydro-2,2-dimethyl-benzofuran-7-yl-methylcarbamate of the following formula

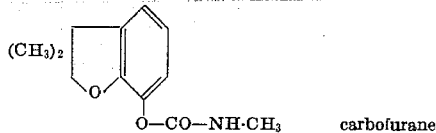

applied in the same manner, was active even 4 weeks after the spray treatment.

EXAMPLE 22

In glass jars which contained plants (*Vicia faba*) infested with bean aphids (*Doralis fabae*), filters were suspended to which the agent of Example 16 in an acetonic solution was applied in such a manner that 0.25 mg/l of air was vaporized. After 48 hours, there was no effect (temperature: 20°C; relative atmospheric moisture: 45 percent). As compared with this result, the agent Dichlorvos (O,O-dimethyl-O-2,2-dichlorovinyl-phosphate) applied in the same manner, was still active in as low a concentration as 0.005 mg/l of air. The low gas phase concentration which results from this test allows the application of the preparation also under glass (greenhouses) in order to combat pests.

EXAMPLE 23

An emulsion concentrate containing
  15 % of agent
  65 % of cyclohexanone or dimethylformamide
  20 % of oxethylated nonylphenol (10 EO).

EXAMPLE 24

Preparation of a dusting powder

| | | |
|---|---|---|
| 20 | g | of agent are ground with |
| 5 | g | of finely dispersed silicic acid, and subsequently blended in a mixer with a mixture of |
| 11.5 | g | of finely dispersed silicic acid |
| 3.5 | g | of polypropyleneglycol (polymerization degree 750) |
| 10.0 | g | of sodium lignin sulfonate |
| 1.0 | g | of sodium oleic acid methyl tauride |
| 49.0 | g | of magnesium/aluminum silicate |
| 100.0 | g | |

What is claimed is:

1. A compound of formula

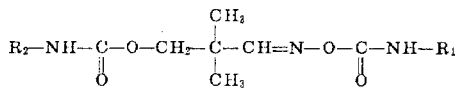

in which $R_1$ and $R_2$ are like or unlike alkyl of one to four carbon atoms or alkenyl of one to four carbon atoms.

2. A compound as defined in claim 1 wherein $R_1$ and $R_2$ are methyl.

3. A compound as defined in claim 1 wherein $R_1$ and $R_2$ are ethyl.

4. A compound as defined in claim 1 wherein $R_1$ and $R_2$ are propyl.

5. A compound as defined in claim 1 wherein $R_1$ and $R_2$ are butyl.

6. A compound as defined in claim 1 wherein $R_1$ is methyl and $R_2$ is ethyl.

7. A compound as defined in claim 1 wherein $R_1$ is methyl and $R_2$ is propyl.

8. A compound as defined in claim 1 wherein $R_1$ is methyl and $R_2$ is allyl.

9. A compound as defined in claim 1 wherein $R_1$ is methyl and $R_2$ is butyl.

10. A compound as defined in claim 1 wherein $R_1$ is butyl and $R_2$ is methyl.

* * * * *